US006315860B1

(12) United States Patent
Holmberg et al.

(10) Patent No.: US 6,315,860 B1
(45) Date of Patent: Nov. 13, 2001

(54) PROCESS AND PRESS FOR MANUFACTURING GLUED BLOCKS

(75) Inventors: Hans Holmberg, Danderyd; Ake Lundqvist, Enhorna; Dick Sandberg, Stockholm; Kjell Wiklund, Kage; Martin Wiklund; Rudolf Wiklund, both of Taby, all of (SE)

(73) Assignee: Primwood AB, Taby (SE)

( * ) Notice: Subject to any disclaimer, the term of this patent is extended or adjusted under 35 U.S.C. 154(b) by 0 days.

(21) Appl. No.: 09/202,224

(22) PCT Filed: Jun. 17, 1997

(86) PCT No.: PCT/SE97/01070

§ 371 Date: Dec. 10, 1998

§ 102(e) Date: Dec. 10, 1998

(87) PCT Pub. No.: WO97/48534

PCT Pub. Date: Dec. 24, 1997

(30) Foreign Application Priority Data

Jun. 19, 1996 (SE) .................................................. 9602426

(51) Int. Cl.[7] .......................... B32B 31/00; B32B 21/13; B27B 1/00; B30B 15/00

(52) U.S. Cl. ....................... 156/583.1; 156/258; 156/259; 156/264; 156/312; 156/512; 156/559; 156/358; 144/347; 144/348; 144/352; 100/38; 100/94; 100/214; 100/297

(58) Field of Search ................................ 156/580, 583.1, 156/258, 264, 266, 512, 517, 559, 358, 259, 312; 144/347, 348, 352; 100/38, 94, 214, 297

(56) References Cited

U.S. PATENT DOCUMENTS

| | | | | |
|---|---|---|---|---|
| 2,198,245 | * | 4/1940 | Goss et al. | 144/354 |
| 3,961,654 | * | 6/1976 | Hawenwinkle | 144/316 |
| 4,122,878 | * | 10/1978 | Kohn | 144/316 |
| 4,547,255 | * | 10/1985 | Yow | 156/580 |
| 5,747,177 | * | 5/1998 | Torimoto et al. | 428/537.1 |

FOREIGN PATENT DOCUMENTS

| | | | |
|---|---|---|---|
| 32 16 669 | | 11/1983 | (DE) . |
| 188 149 | | 12/1981 | (NZ) . |
| 193 046 | | 4/1984 | (NZ) . |
| 501 131 | | 11/1994 | (SE) . |
| WO 83/03791 | | 11/1983 | (WO) . |
| 92-16339 | * | 10/1992 | (WO) . |

* cited by examiner

*Primary Examiner*—Linda Gray
(74) *Attorney, Agent, or Firm*—Young & Thompson

(57) ABSTRACT

The invention relates to a process and a device for the manufacturing of a glued block made of triangular cross-sectioned elongated staves of wood. The staves of wood are laid beside each other with alternate staves with their base sides downwards and alternate ones with their base sides upwards, and adhesive applied between adjoining surfaces between the staves. A press (13, 14, 21–33) applies main pressure force to glue the staves firmly together is transverse to the base sides of the staves.

21 Claims, 5 Drawing Sheets

PROCESS AND PRESS FOR MANUFACTURING GLUED BLOCKS

The present invention relates to a process for manufacturing glued blocks, and a device for performing the process.

BACKGROUND OF THE INVENTION

In order to get as much as possible shape-stable wood material with a hard surface and a pleasing appearance out of a log of wood, a so-called star-sawing technique is used in certain cases which gives, amongst others, triangular staves of wood. One such technique is described, for example, in the Swedish patent application No. 9100830-0. These triangular staves of wood can then be laid beside each other with their bases alternately turned upwards and downwards and joined together to form a large block. This block can be used as it is for table tops, floor material or the like but it can also be sawn up into thinner and/or narrower boards along or across the direction of the grain.

During manufacturing of glued blocks where the material consists of triangular starsawn wooden elements there sometimes occur large problems in getting the block perfectly glued when conventional techniques are used. The problems consist, amongst others, in that the friction forces on the upper and lower surfaces are much greater in the case where the force is applied in the conventional manner against the longside edges, i.e. against the outermost staves of wood in a laid-out series of staves of wood. The pressure from the press is lost the closer one gets to the middle of the block, which means that the glued joints near the middle become less durable.

WO 83/03791 describes a method and arrangement for making glue joint blocks according to the priorly known technics (see especially pages 11 and 12). The triangular staves of wood are provided on place between the lateral pressure plates which then are place having a distance between them adapted to the pattern of triangular staves which are layed on a lower board. In order to keep the staves on place during the pressure procedure the staves having their bases upwards are pressed down a little such that their tops are protruding downwards between the bases or the staves having their bases downwards and then fixed in that position. After that the pressure proceeding begins by pressing the lateral pressure plates together. Thus the pressure is here provided against the outer staves in the block.

OBJECTS OF THE INVENTION

One object of the process and device according to the invention is to achieve durable glue joints between essentially triangular staves of wood which are laid beside each other.

Another object of the process and device according to the invention is to achieve a glue joint between staves of wood laid beside each other which is satisfactory all the way through to the surface of the block formed from them.

These objects are attained with a process according to claim 1. Further features and developments, and a device for performing the process, are mentioned in the other claims.

BRIEF DESCRIPTION OF THE FIGURES

The invention is described more closely below with reference to the appended drawings, where.

DETAILED DESCRIPTION OF THE FIGURES

Figure 1:
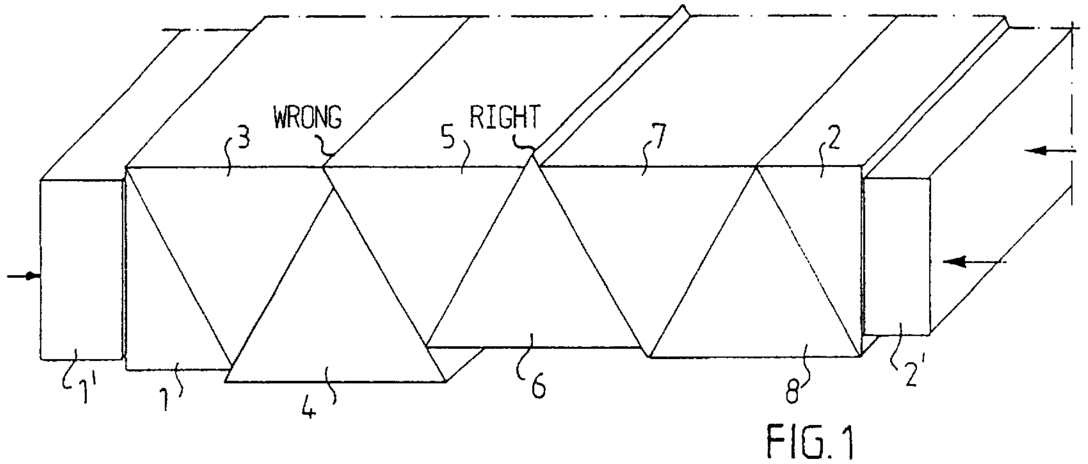
FIG. 1 PRIOR ART
FIG. 1 shows an end view of a block and illustrates schematically the correct and incorrect placing of triangular staves of wood during gluing together.

In FIG. 1 triangular staves of wood are shown laid out side by side alternatively with the base facing downwards and alternatively with the base facing upwards and are seen from one end. The outermost staves of wood 1 and 2 are essentially right-angled between the base and the outer side. The other staves of wood 3–8 are preferably isosceles, or, even better, equilateral. It is also possible within the scope of the invention to conceive using irregular triangular cross-sections but it is not directly practical to use such. FIG. 1 shows that it is known in the prior art during gluing to press against the outermost staves of wood 1 and 2 via press blocks 1' and 2', respectively, i.e. from the longitudinal edge sides. In this case it is apparent that the staves of wood are displaced vertically in relation to each other in a somewhat uncontrolled manner, as is evident from the Figure. A conventional press with side forces also gives powerful friction on the outermost staves towards the upper and lower sides and with consequently diminishing glue pressure towards the middle of the glued block leading to bad glue joints and the risk of worsened quality.

According to the invention the glue joints are achieved through the triangular staves of wood being pressed together from the broad sides. In the embodiment shown in FIGS. 2A and 2B, a press head 9 and 10 is placed on each of the broad sides in order to hold the staves of wood well pressed together during the formation of the glue joints. An adjustable dolly 11 and 12 is placed by each of the outermost staves of wood in order to hold together the staves of wood in the lateral direction. Especially in this embodiment it can also be suitable to provide a certain pressure against the staves of wood from the dollies so that the staves of wood are well held together in the lateral direction during the whole press operation.

A variant is to pump with pressure during the pressing together phase. This evens out the pressure force between the joints.

Figure 2A:
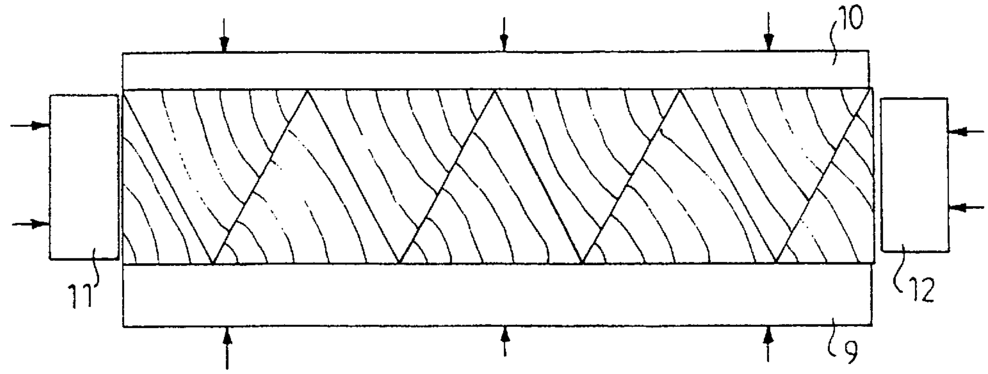
FIGS. 2A & 2B show sections through a first embodiment of a device for pressing together staves of wood during gluing, and also illustrate a suitable orientation of the annual rings of the staves of wood which are to be glued together.
Figure 2B:
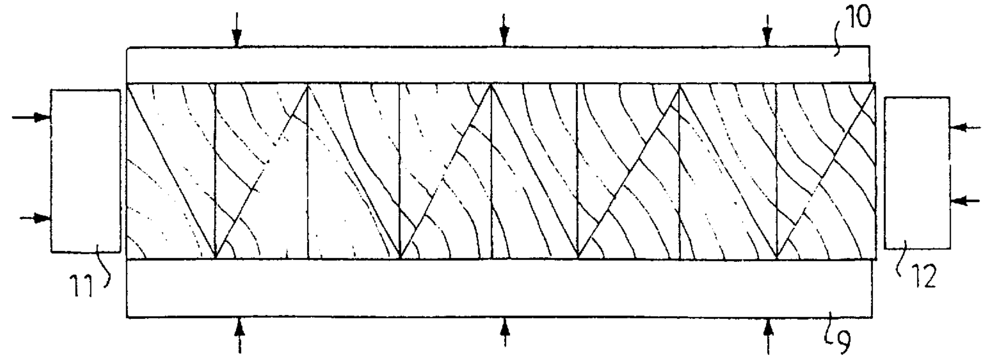

The wood material with a triangular-shaped cross-section is preferably laid into the press with the annual rings directed essentially in line with each other so that the material/block receives a similar expansion/contraction at different moisture levels and therefore gives a material which, relatively seen, warps less than if the annual rings were laid out in another way. Preferably they should be directed essentially transverse to the width of the block, as is shown in FIG. 2A and 2B. In this way the movements due to moisture takes place essentially in the direction of thickness of the finished block and not along its width, which is an important advantage if the block is used, for example, as a floor covering or the like. Furthermore, after the pressing is finished, a sawing device can saw the completed glued block into thin sheets through cutting essentially parallel with the broad sides of the block.

FIG. 2A shows essentially isosceles pieces of wood. FIG. 2B shows that also gluing together of pieces of wood with a triangular cross-section with a right angle, e.g. the angles 45°/45°/90°, can function with the method according to the invention. Such triangular pieces of wood can be produced by the well-known sawing pattern called quarter-sawing. Dollies 11 and 12 determine the width of the block in the lateral direction, and the pressure from the press on the extended surfaces causes the inclined surfaces to glide towards each other so that the transverse surfaces are pressed towards each other, by means of which a good glue joint is also achieved there.

Preferably, the essentially triangular-shaped wood elements—in order to give a satisfactory glue joint—should be displaced so that a certain part of the peak lies above the surface of the base of the surrounding triangles in order to ensure that the glue joint extends all the way up to the finished surface without faults. Furthermore, in this case narrow stripes are formed in the surface, which enhance the appearance of the surface. The risk that the point comes under the base surface is large, as is illustrated at the joint between the staves of wood 3, 4 and 5 in FIG. 1, when the pressure of the press in the glue joint diminishes drastically and the glue joint becomes poor. Furthermore, in such a case the block must be planed down in order to have an acceptable appearance.

Figure 3:
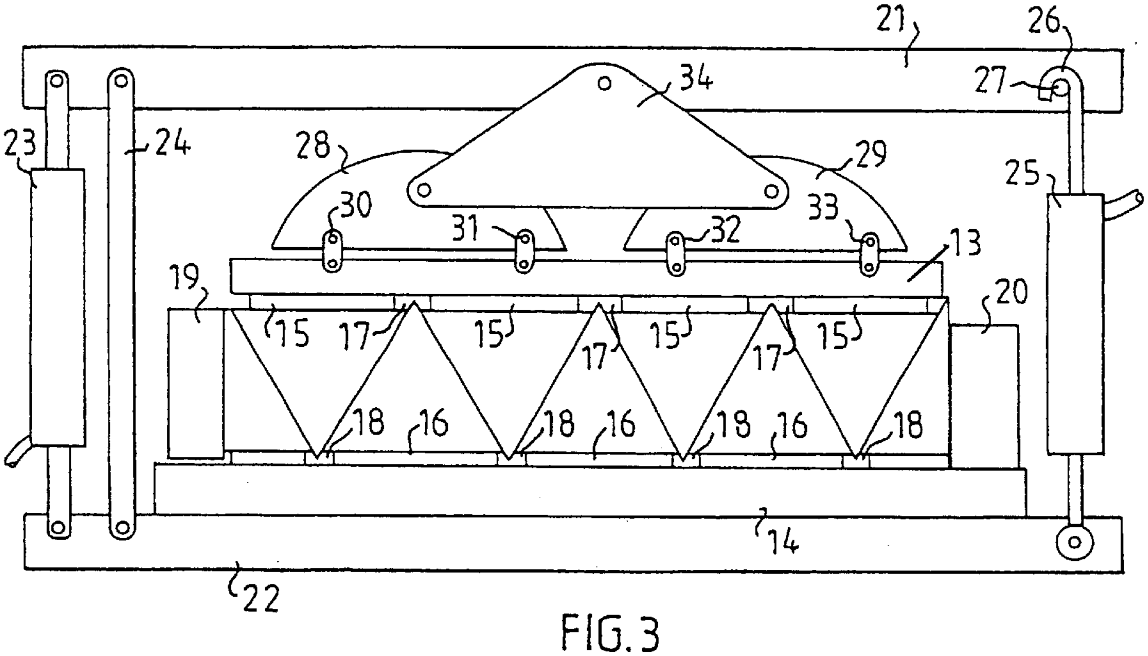
FIG. 3 shows a section through a schematically illustrated second embodiment of a device for pressing together staves of wood during gluing.

FIG. 3 shows an embodiment in which the press heads 13 and 14 are provided with parts 15 and 16, respectively, which have spaces 17 and 18, respectively, between them which can accommodate projecting peak edges of the staves of wood.

The press plates of the press can alternatively be equipped with a flat surface with longitudinal grooves where the peak edges from the triangular-shaped material can fit in. It should, however, be observed that it is not necessary that the triangular staves of wood have completely pointed edges in the part which is directed towards a block surface. During planing it is practical, most of all for the sake of feed devices, to plane down one point of the triangular profile. This type of planed staves of wood can perfectly well be used in accordance with the invention.

In another alternative the press plates have a relatively thick coating of a material which is yielding to counterpressure from a projecting part, such as a pointed edge, from the essentially flat glue joint plate but which is essentially non-yielding in general (not shown). A suitable material is therefore rubber or elastic or rigid soft plastic where the pointed edges during pressing are introduced into the material. The material should be relatively stiff in order to be essentially less yielding to the broad sides of the triangular staves of wood than to their pointed edges. The material should have a low friction to the introduction of the pointed edges and preferably also in the transverse direction at the joint between the material and the wood elements.

The press has an adjustable compartment, comprising e.g. adjustable side pieces 19 and 20, respectively, for the insertion of the triangular staves of wood lying beside each other. In this case the side pieces should be made in such a way that the compartment corresponds to the expected width of the produced block with suitable tolerances.

As shown in the embodiment in FIG. 3 of a press, each plate in the upper part of the press, "cover", can be equipped with a vertical force producer, e.g. hydraulically, which presses together the material which is provided with glue during the adaptation. By means of the triangular-shaped material, a vertical force is obtained which gives an even pressure on each piece of material (stave) independent of the width of the block, which gives good glue joints over the whole surface.

In this embodiment of the press, the pressure heads 13 and 14 are placed between an upper part 21 and a lower part 22. Hydraulic traction cylinders 23 and 25 are placed on both sides and one of them is controlled during the opening of the press and the other during the pressing operation. Despite only two being shown, there should be at least four, i.e. two on each side of the pressure-loaded region. The pressure cylinder 23 is pivotally fastened at both ends to the upper part 21 and to the lower part 22. Beside and inside the pressure cylinder 23, a pull rod 24 is pivotally fastened in the same way.

The pressure head 14 can be, but does not have to be, comprised as a part of the lower part 22. FIG. 3 shows that the hydraulic cylinder 25 is rotatably mounted on the lower part 22 and equipped with a hook 26 for hooking onto a peg 27 on the upper part 21. In this way the upper part 21 is openable at one end and rotatable around the pull rod 24 by being pulled by means of the hydraulic cylinder 23 for easy placement of the triangular staves of wood and regulation of the side pieces 19 and 20.

Pressing together occurs by means of the hydraulic cylinder 25 when it is hooked fast in the upper part 21. The hydraulic cylinder 23 is in this case inactive. Between the upper part 21 and the pressing plate 13 there is a force-distributing arrangement in order to give a pressure load which is as uniform as possible on the block of triangular staves. Two pressing blocks 28 and 29 are arranged over the pressing plate, which each are anchored to the pressing plate via at least two links 30, 31 and 32, 33, respectively, which are somewhat movable transversely and which run in the same direction as the direction of grain of the triangular staves of wood. At their front and rear ends the pressing blocks 28 and 29 are pivotally fastened to a block 34, which is pivotally fastened to the upper part 34. Through this construction, pressure is transferred from the upper part 21 to the pressure distributor along only one line, which runs parallelly with the block, and a nearly uniform pressure distribution is achieved during tensioning of the hydraulic cylinder 25 even if the upper part 21 is placed at an angle. It should be noticed that for the process according to the invention, the important thing is precisely to achieve a uniform pressure on both sides of the block and that this can be achieved even in other ways than that shown in FIG. 3.

The small amount which the point edges on the triangular staves of wood stick up over the surface of the glued-together block, forms a very small part of the total block volume and therefore gives the possibility to produce a block with good-quality glue joints with a low volumetric loss. On the other hand, a fault of the type which is shown in FIG. 1 with sunken point edges during planing down naturally gives an extremely large cost/volymetric loss for a comparable quality level.

Figure 4A:
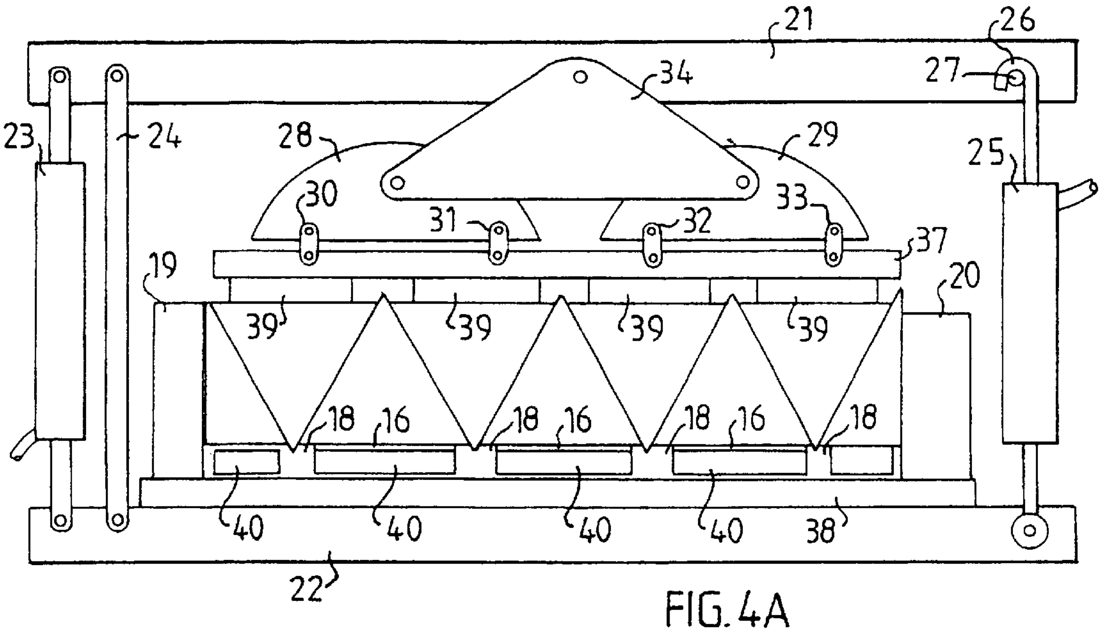
FIG. 4A shows an end view through a schematically illustrated third embodiment of a device for pressing together staves of wood during gluing.

In a third embodiment shown in FIG. 4A the pressure units are formed on the base sides of the glued block by means of a number of loose and/or guidable flat plates on a foundation 37 and 38, respectively, upon which the pressure is applied in a way as described in connection to FIG. 3. The plates 39 and 40, respectively, placed on the foundation 37 and 38 are movable in the transverse direction, e.g. along guides (not shown), in order to give a space between them for each point edge of the triangular board and are controllably adjustable for the various conceivable dimensions of the material. The adjustment of the plates 39 and 40 can possibly take place by hand but also with the help of electronic control systems and performed during the unloaded condition of the press, i.e. before the hydraulic cylinder 25 in the locked position is activated.

The side supports are normally controllably adapted to fit the desired finish dimension and chosen material dimension. By means of the pressure on both broad sides the staves of wood can be moved in the transverse direction to the desired dimension because the point edges during the applied pressing action are able to stick out without thereby contacting any obstacle.

The block can also be manufactured in a continuously working press which is a modification of that described in connection to FIG. 4A. This press can have plates 39 and 40 with a significantly smaller length than the length of the staves of wood in their direction of grain. The side pieces 19 of the press can even be displaceable for movement in the longitudinal direction along the block. When a section of the glued block is pressed and ready, the press is opened and the plates moved to the next section.

Figure 4B:
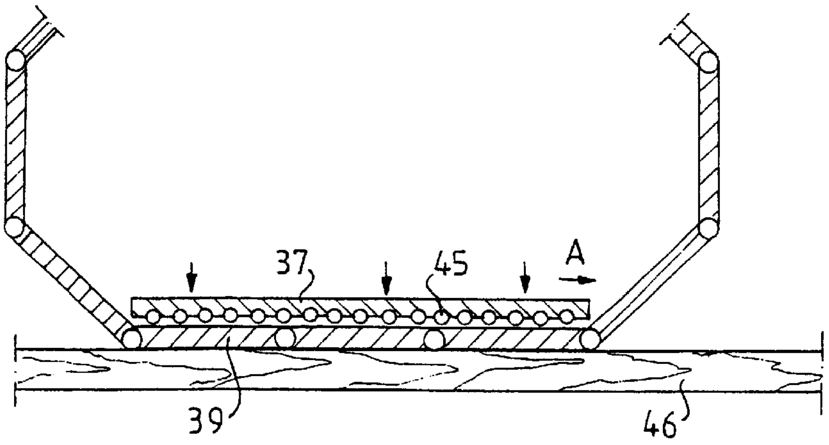
FIG. 4B shows a schematic longitudinal section through a part of the device shown in FIG. 4A.

Preferably the staves of wood of the block are placed stationary, possibly through their ends being firmly anchored (not shown). The moving parts of the press can thereby during movement ran against e.g. ball races, which give low friction in the longitudinal direction and high stiffness in the pressure direction. The movable parts can then be returned to their original position by means of, for example, a return transport or hinged arms so that a flat, continuous (and, in the longitudinal direction, easily movable) pressure is given to the material. There are different known solutions for performing this. These are normal for chipboard presses. Here the plates are equipped with links and go round runner wheels. Underlying supports are designed so that the edges of the plates do not make impressions in the blocks. FIG. 4B shows schematically such an embodiment in a longitudinal section of part of the upper part of the press, where the plates 39 are shaped as links and a ball race 45 is situated between the pressure plate 37 and the plates 39. The pressure plate 37 is moved stepwise in the direction of arrow A along the stave of wood 46, while at the same time the joined-together plates 39 step by step are moved downwards towards the staves of wood by the pressure plate 37.

The pressure plates can instead be equipped with heating elements or be heated by means of IR-technique on the outside in order for the glue in the glued block to set quickly and surely during the pressing operation. Preferably, a glue should be chosen which does not set quickly before it has been subjected to heat, so that the gluing together does not take place outside the portion of the glued block which has been subjected to pressure. A suitable glue in this connection is phenol/rescorcinol glue or melamine glue for weather-resistant products or PVAC-glue for indoor products.

Figure 5:
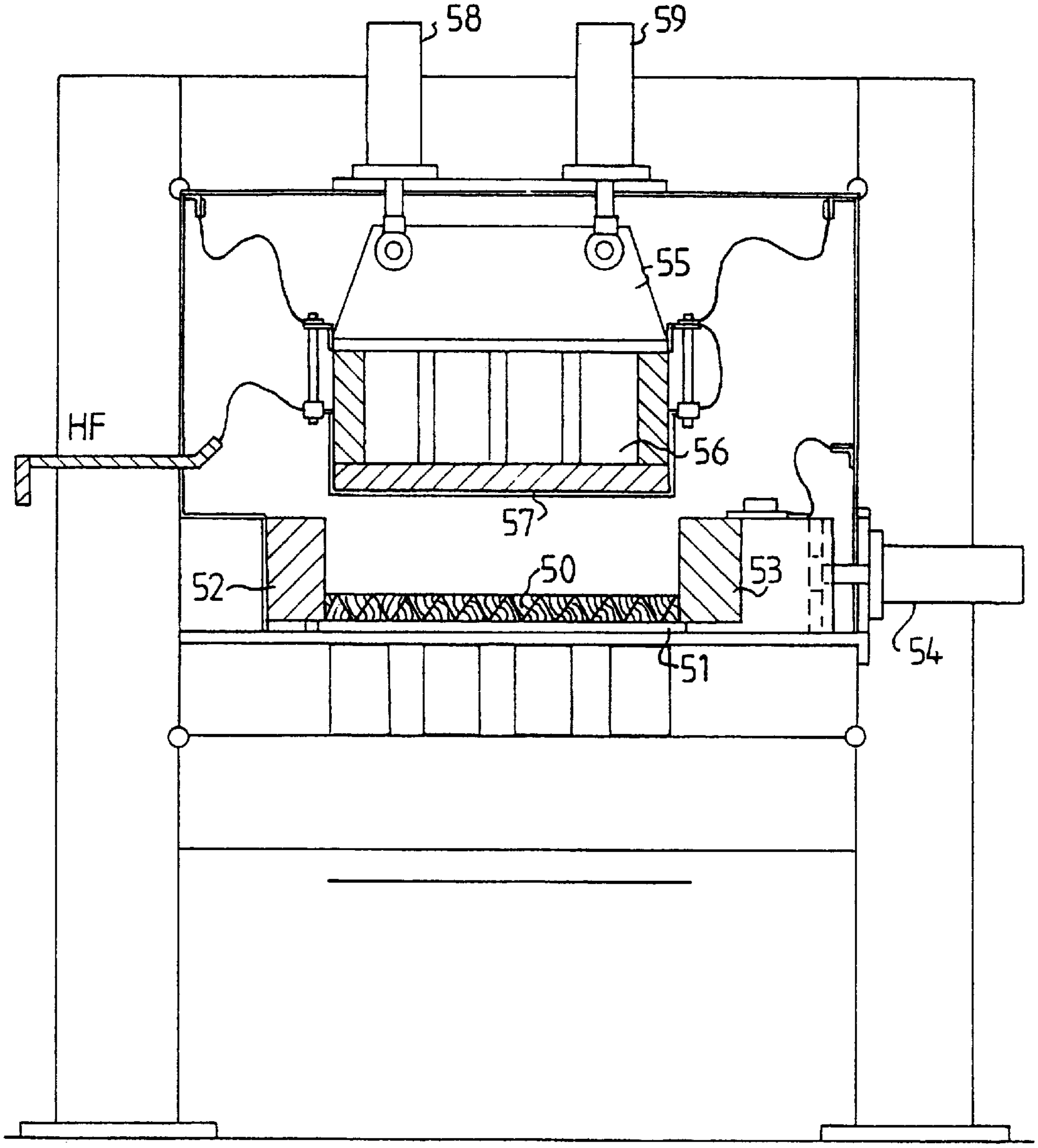
FIG. 5 shows an embodiment with HF-heating of the glued block during pressing.

In another alternative, microwave energy or HF-heating can be provided for setting the glue. An embodiment of a press with these features is shown in FIG. 5. The staves of wood which are to form the glued block 50 are placed on the base plate 51 between the side pieces 52 and 53. An adjusting means 54 for these is indicated schematically. The upper part 55 of the press in this embodiment is guided to press against the glued block 50 by hydraulic cylinders 58 and 59 arranged beside each other, and comprises a high-frequency heating part 56 supplied from a high-frequency source HF. The heating part is of known type and consequently does not need to be described more closely. The plates 57 facing towards the glued block can in this connection be provided with openings, which in the main are greater than the wavelength of the supplied energy, or the plates can be made of a non-conducting material with a suitably low $\epsilon$, e.g. a suitable composite, which the supplied energy can pass through, whereby the setting can take place more quickly with a higher productivity as a consequence. A suitable glue in this embodiment is e.g. PVAC-glue.

In this alternative, the triangular staves of wood are laid after each other in the press, either end to end with the adjacent staves of wood in the transverse direction displaced in relation to each other for the sake of strength, or with each end (and/or at least one of the long sides) of the staves of wood prepared for splicing (finger splices) which gives a higher total strength.

Figure 6A:
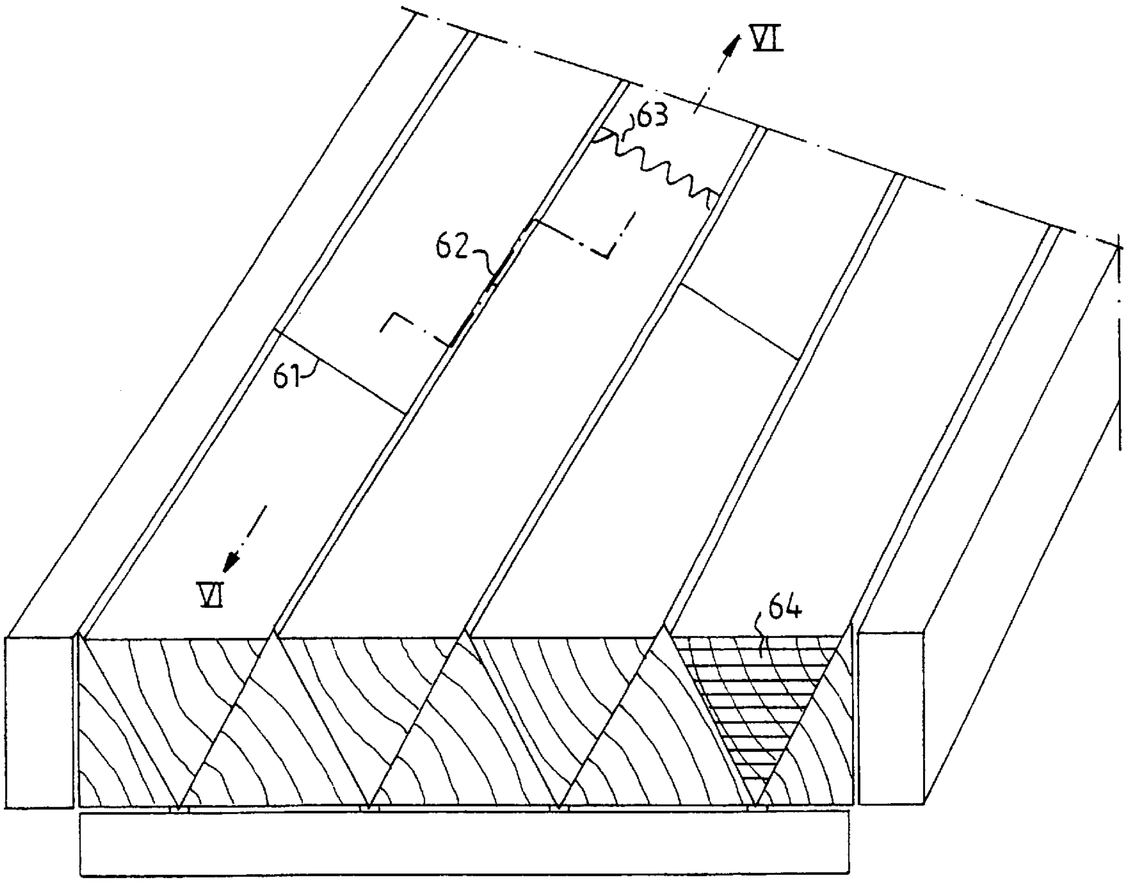
FIGS. 6A and 6B shows a perspective view, partly in section, and a longitudinal section along the broken line VI—VI in FIG. 6A, respectively, of joints in the longitudinal direction.
Figure 6B:
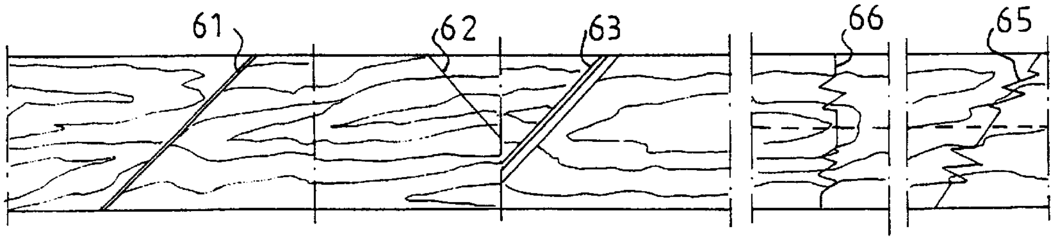

As apparent from FIGS. 6A and 6B, it is also possible to use the principles according to the invention for providing a glue fastening between the staves of wood laid after each other. Each stave can be obliquely cut even at its ends before the stave is laid together with another obliquely sawed stave at its end to make an extended stave. The individual staves in a block could be extended at different lengths as illustrated at the end cuts 61, 62 and 63. In this way, endless blocks could be created which could be cut in arbitrary lengths. The oblique end cuts could be smooth as at 61 and 62 or spliced as at 63, where the finger cut is visible from the surface of the block, or as at 64 showing an end cut having the slicing parallel to the surface of the block such that only a straight line is apparent from the block surface. A particular oblique cut of this kind is shown at 65 in FIG. 6B in that the cut is smooth at the ends and in the middle in order not to influence the surface parts and in order to make it possible to divide the block into two and still having a nice surface at the cut. The finger cut could also be perpendicular to the block surface as illustrated at 66.

The kind of extension discussed above will save wood stuff, provide valid blocks since each stave will be supported by the adjacent staves at the joints and make it easy to produce blocks of wished and arbitrary dimensions.

What is claimed is:

1. Process for the manufacturing of only a single-layered glued block of triangular cross-section, elongated staves (3–8) of wood where the staves for forming the block are laid beside each other in only a single row lying in only a single plane with alternate staves (4) with their base sides downwards and alternate ones (3) with their base sides upwards and unset glue applied between all adjacent surfaces between the staves when placed in the single row, wherein a main pressure force to glue the staves firmly together is exerted transverse to the base sides of the staves (3–8), which is obtained by a movement of only a common pressure plate (10, 13, 37) only perpendicular to said single plane while the staves are locked between two lateral stops.

2. Process according to claim 1, characterized by providing cavities in the pressure plate and/or a support plate in front of the point edges of the triangular staves of wood or providing a material for the pressure plate flexible when actuated by the point edges in order to provide pressure force with considerably higher force onto the base sides of the triangular staves than on their opposite peak edges.

3. Process according to claim 1, characterized in that side supports (11, 12; 19, 20) are positioned against the longitudinal edges before the pressure force is exerted on the base sides.

4. Process according to claim 3, characterized in that the side supports are rigidly set.

5. Process according to claim 3, characterized in that the side supports are controllably adjusted.

6. Process according to claim 3, characterized in that a pressure force is also exerted on the side supports in a direction towards the glued block.

7. Process according to claim 1, characterized in that the glued block is heated up in the pressing region during pressing towards the base sides of the staves.

8. Process according to claim 7, characterized in that the heating takes place through heating of said pressure plate.

9. Process according to claim 7, characterized in that the heating takes place through microwave- or HF-heating of the pressure plate.

10. Process according to claim 1, characterized in that each said stave is obliquely cut at its end and joined with another stave also cut obliquely at its end to provide an extended stave, in that several staves are extended in this way, and in that several extended staves are laid beside each other.

11. Process according to claim 1, characterized in that each said stave is obliquely or transverse cut using finger joint technique at its end and joined with another stave also cut accordingly at its end to provide an extended stave, in that several staves are extended in this way, and in that several extended staves are laid beside each other.

12. Process according to claim 1, wherein said block has two major opposite surfaces, and the annual rings of the wood are substantially transverse to said surfaces.

13. Press arrangement for manufacturing of only a single-layered glued block made of triangular cross-section staves of wood, where the staves are laid beside each other in only a single row lying in only a single plane with alternate staves with their base side downwards and alternate ones with their base sides upwards and glue applied between adjacent surfaces between the staves, a pressure plate (10; 13, 15; 37, 39) is provided facing towards the upwardly facing base sides of the staves, and a supporting plate (9; 14, 16; 38, 40), for supporting the downwardly facing base sides of the staves, side supports placed along each long side edge of the laid out staves to lock the staves between lateral stops, and a pressure supplying device (21–25, 28, 29, 34) moving only the pressure plate towards the bases of the triangles of the staves only perpendicular to said single plane in the direction towards the support plate during activation of the pressure plate;

characterized in that the support plate and/or the pressure plate have cavities directly in front of the point edges of the triangular staves of wood.

14. Press device according to claim 13, characterized in that the side supports (11, 12; 19, 20) are placed at a mutual distance which is adapted to the desired transverse dimension of the block.

15. Press device according to claim 13, characterized in that the support plate and/or the pressure plate have a coating of a material which is yielding to pressing from a point edge of the staves which extend out between two adjacent base sides but which is otherwise essentially non-yielding.

16. Press device according to claim 13, characterized by a heating arrangement for heating the staves during applied pressure.

17. Press device according to claim 16, characterized in that the heating arrangement is a microwave- or HF-heating device.

18. Press device according to claim 13, characterized in that the triangular staves of wood are laid with the annual rings oriented essentially transverse to the opposite block surfaces.

19. Press device according to claim 13, characterized in that, when laid in the press device, some of said stave are obliquely cut at its end and joined with another stave also cut obliquely at its end to provide an extended stave, and the extended staves are laid beside each other, the pressure plate is provided across the joints between the extended staves.

20. Press arrangement for manufacturing of only a single-layered glued block made of triangular cross-section staves of wood, where the staves are laid beside each other in only a single row lying in only a single plane with alternate staves with their base side downwards and alternate ones with their base sides upwards and glue applied between adjacent surfaces between the staves, a pressure plate (10; 13, 15; 37, 39) is provided facing towards the upwardly facing base sides of the staves, and a supporting plate (9; 14, 16; 38, 40), for supporting the downwardly facing base sides of the staves, side supports placed along each long side edge of the laid out staves to lock the staves between lateral stops, and a pressure supplying device (21–25, 28, 29, 34) moving only the pressure plate towards the bases of the triangles of the staves only perpendicular to said single plane in the direction towards the support plate during activation of the pressure plate;

characterized in that the support plate and/or the pressure plate comprise laterally adjustable plate sections (40, 39).

21. Press arrangement for manufacturing of only a single-layered glued block made of triangular cross-section staves of wood, where the staves are laid beside each other in only a single row lying in only a single plane with alternate staves with their base side downwards and alternate ones with their base sides upwards and glue applied between adjacent surfaces between the staves, a pressure plate (10; 13, 15; 37, 39) is provided facing towards the upwardly facing base sides of the staves, and a supporting plate (9; 14, 16; 38, 40), for supporting the downwardly facing base sides of the staves, side supports placed along each long side edge of the laid out staves to lock the staves between lateral stops, and a pressure supplying device (21–25, 28, 29, 34) moving only the pressure plate towards the bases of the triangles of the staves only perpendicular to said single plane in the direction towards the support plate during activation of the pressure plate;

characterized in that its press region extends over a part of the length of the glued block and is movable in order to displace the pressure zone along the plate at suitable time intervals adapted to the setting time of the glue used.

* * * * *